(12) United States Patent
Wise

(10) Patent No.: US 6,928,341 B2
(45) Date of Patent: Aug. 9, 2005

(54) COMPUTATIONAL AIR DATA SYSTEM FOR ANGLE-OF-ATTACK AND ANGLE-OF-SIDESLIP

(75) Inventor: Kevin A. Wise, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 21 days.

(21) Appl. No.: 10/436,936

(22) Filed: May 13, 2003

(65) Prior Publication Data

US 2005/0090947 A1 Apr. 28, 2005

(51) Int. Cl.[7] .......................... G06F 19/00; G01P 13/00
(52) U.S. Cl. ........................................ 701/6; 244/181
(58) Field of Search ............................ 701/3, 6, 220; 244/181

(56) References Cited

U.S. PATENT DOCUMENTS

| | | | | |
|---|---|---|---|---|
| 4,046,341 | A | * | 9/1977 | Quinlivan .................. 244/181 |
| 4,769,759 | A | | 9/1988 | McGough |
| 6,253,166 | B1 | * | 6/2001 | Whitmore et al. ............. 703/2 |
| 6,273,370 | B1 | | 8/2001 | Colgren |
| 6,466,888 | B1 | * | 10/2002 | McCool et al. ............. 702/144 |
| 6,561,020 | B2 | * | 5/2003 | Glenney ................... 73/170.02 |
| 6,772,080 | B2 | * | 8/2004 | Luo ............................. 702/96 |
| 6,772,976 | B1 | * | 8/2004 | Rouse et al. ................ 244/1 R |

OTHER PUBLICATIONS

"Flight Test Validation of Sideslip Estimation using Inertial Accelerations", co–authored by Richard Colgren and Keith Martin, Proceedings of the 2000 AIAA Guidance, Navigation and Control Conference, Denver, CO, Aug. 14–17, 2000.

"A Proposed System Architecture for Estimation of Angle–of–Attack and Sideslip Angle", co–authored by Richard Colgren, Michael Frye and Wayne Olson, 1999 AIAA Guidance, Navigation and Control Conference, Portland, OR, vol. 2 of 3, pp. 743–750, Aug. 9–11, 1999.

"The Feasibility of Using an INS for Control System Feedbacks", authored by Richard Colgren, 1998 American Institute of Aeronautics and Astronautics, Inc., 1–11.

* cited by examiner

Primary Examiner—Michael J. Zanelli
(74) Attorney, Agent, or Firm—Thompson Coburn LLP

(57) ABSTRACT

A computational air data method and system for estimating angle-of-attack and angle-of-sideslip of an aircraft utilizing a detailed aerodynamic model of the aircraft, extended Kalman filters, inertial system measurements of body rates and body accelerations, and computation of dynamic pressure.

24 Claims, 2 Drawing Sheets

COMPUTATIONAL AIR DATA SYSTEM FOR ANGLE-OF-ATTACK AND ANGLE-OF-SIDESLIP

This specification includes a computer program listing appendix contained on a compact disc, said computer program listing appendix being incorporated-by-reference herein. There are two compact discs which are identical: labeled Copy 1 and Copy 2. The name of the file on each disc is CAD_AutoCode.c; the date of creation of the file was May 6, 2003; the size of the file is 534,944 bytes.

BACKGROUND OF THE INVENTION

The present invention is directed to determining the angle-of-attack and angle-of-sideslip of an aircraft, and more particularly to a computational method and apparatus for making such determinations, thereby eliminating the need for air data sensors used with traditional air data systems.

Air data systems are required on aircraft as part of the flight control system. These systems require the addition of air data pressure sensors to the exterior of the aircraft to measure the angle-of-attack (AOA) α and angle-of-sideslip (AOSS) β. On stealth aircraft a flush-port air data system (FADS) is typically used. These FADS systems typically have in excess of 10 pressure ports/sensors. These sensors make the aircraft less stealthy, and increase maintenance and operations costs. Such air data systems must also be redundant electrically and mechanically, have significant heating requirements to make them operational in all weather conditions, and require significant software development effort.

SUMMARY OF THE INVENTION

The present invention eliminates these air data sensors required to measure AOA and AOSS, thereby reducing cost and weight and making military aircraft more stealthy, and can provide analytical redundancy to existing air data systems used in legacy platforms. The present invention makes it possible to reduce the hardware and software of a FADS system down to just a static and total pressure measurement system (two ports/sensors), greatly simplifying the air data system. This makes the aircraft more stealthy, and by eliminating expensive pressure sensors and the ports for these sensors, greatly improves the "low observable" maintainability of the aircraft. Also, reducing the number of sensors reduces the heating requirements, wiring cost and weight, thus reducing overall electrical power consumption.

Moreover, FADS require sophisticated software algorithms for modeling and converting pressure measurements into AOA and AOSS. Initial FADS software is based on wind tunnel data which is often inaccurate and uncertain. Expensive flight testing must be performed to calibrate the FADS algorithms, usually requiring several software iterations before the system is accurate enough to be used as part of the flight control system. The present invention eliminates the FADS software for computing AOA and AOSS altogether, and the cost of maturing FADS through flight test. Furthermore, any changes made to the outer mold lines of the aircraft would require a complete re-work of any FADS algorithms, as well as re-validation and calibration in flight test. The present invention uses the same aerodynamic model used to design the flight control system, and does not require any additional rework. This is of particular importance where limited numbers of a particular aircraft are expected to be built and may significantly vary between production builds.

In accordance with a preferred embodiment of the invention, extended Kalman filters are used to estimate AOA and AOSS. The algorithm processes inertial system measurements of body rates and body accelerations, and uses a detailed aerodynamic model of the aircraft. Static pressure and total pressure also are provided to the algorithm to compute dynamic pressure.

Further features and advantages of the present invention, as well as the structure and operation of various embodiments of the present invention, are described in detail below with reference to the accompanying drawings.

DETAILED DESCRIPTION OF PREFERRED EMBODIMENTS

Figure 1:
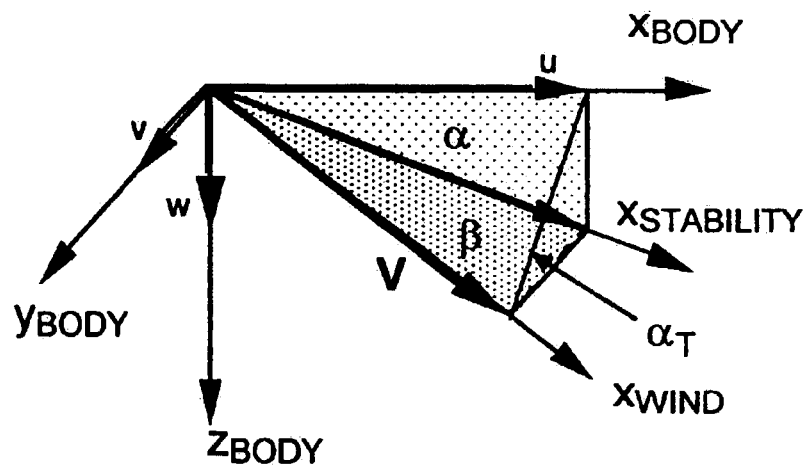
FIG. 1 is a vector diagram defining the angle-of-attack ($\alpha$) and angle-of-sideslip ($\beta$) of an aircraft to be estimated in accordance with the invention.

The present invention is a Computational Air Data System (CADS) utilizing a set of algorithms that estimates the AOA ($\alpha$) and AOSS ($\beta$) as defined in FIG. 1. The x, y, z coordinate systems shown in FIG. 1 are located at the aircraft's center-of-gravity. There are three coordinate systems identified in FIG. 1: The "wind" axes; the "stability" axes; and the "body" axes. The aircraft's velocity vector V is along the x-axis of the wind coordinate system $X_{WIND}$. A rotation using the AOSS $\beta$ rotates the velocity vector to the stability axes (vector shown along $x_{STABILITY}$). A rotation using the AOA $\alpha$ then rotates the stability axes to the body axes. The aircraft's velocity is described in body axes using components u, v, w along the $x_{BODY}$, $y_{BODY}$, $z_{BODY}$ axes, respectively.

Figure 2:
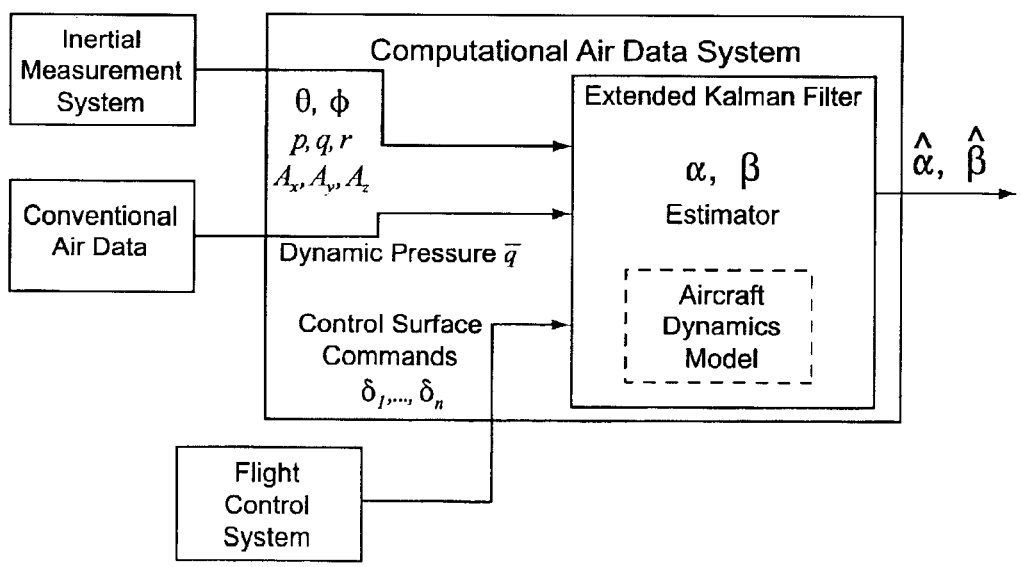
FIG. 2 is a general block diagram illustrating a preferred embodiment of the present invention.

The CADS algorithms use a detailed aircraft aerodynamic model and an extended Kalman filter that processes Inertial Measurement Unit (IMU) measurements of body rates and accelerations, and a conventional air data system measurement of dynamic pressure derived from total air temperature, static and total pressure. FIG. 2 illustrates the inputs and outputs from the computational air data system.

Extended Kalman filters are used in a variety of applications to estimate dynamic state vectors. The algorithms for extended Kalman filters have been published in many text books and are well known to those skilled in the art.

In accordance with a preferred embodiment of the invention, The CADS algorithms are partitioned into decoupled pitch and roll-yaw algorithms. However, it is to be understood that it is within the scope of the invention that they could also be implemented in a coupled pitch-roll-yaw implementation, although an increase in the computer throughput would be required.

An extended Kalman filter is used because the dynamical equations describing the motion of an aircraft through the atmosphere are nonlinear. The CADS algorithms include the following elements:

1. State space dynamical model (nonlinear)
2. Extended Kalman filter algorithms

3. Detailed model equations
4. Measurements used in CADS

State Space Dynamical Model

The dynamics of an aircraft are modeled in a nonlinear state space form as follows:

$$\dot{x}(t) = a(x(t), u(t), t) + Gw(t) \quad (0.1)$$

$$z(t) = h(x(t), u(t), t) + v(t)$$

where $x \in \Re^{n_x}$ is the state vector, $u \in \Re^{n_u}$ is the control input vector, $w \in \Re^{n_w}$ is the stochastic plant disturbance, $z \in \Re^{n_z}$ is the measurement vector, $v \in \Re^{n_z}$ is the stochastic measurement noise, and $G \in \Re^{n_w \times n_w}$ is the plant disturbance distribution matrix. The vector fields $a(\bullet)$ and $h(\bullet)$ model the nonlinear state dynamics and measurements. Jacobians of both $a(\bullet)$ and $h(\bullet)$ with respect to the state vector x are required in the extended Kalman filter, and are given by $$A(x(t), u(t), t) = \left.\frac{\partial a(x(t), u(t), t)}{\partial x}\right|_{x=\hat{x}} \quad (0.2)$$

$$H(x(t), u(t), t) = \left.\frac{\partial h(x(t), u(t), t)}{\partial x}\right|_{x=\hat{x}}.$$

The plant process disturbance vector w and measurement noise v are assumed to be zero mean, uncorrelated, uncorrelated to the state vector, wide sense stationary, and have covariance matrices Q and R, respectively.

Figure 3:
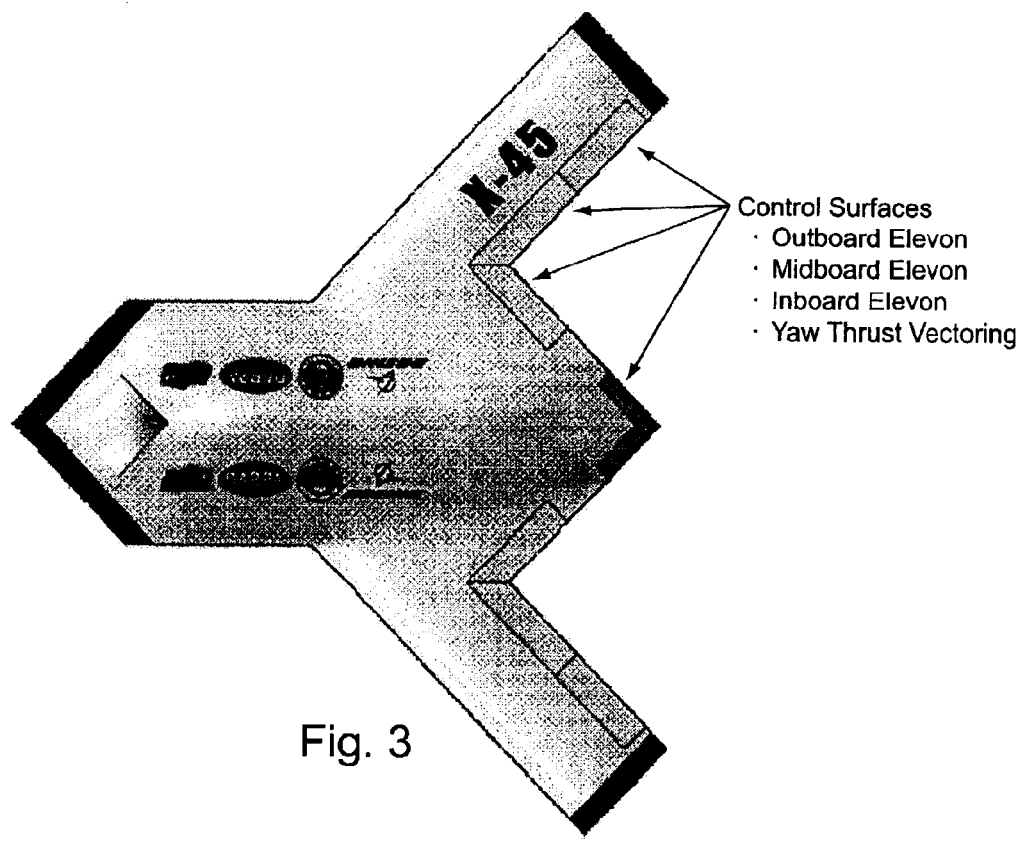
FIG. 3 is an illustration exemplifying control surfaces using the Air Force X-45A Unmanned Combat Air Vehicle.

The control input vector u contains the commands to the control surfaces of an aircraft or missile. The commands come from the flight control system onboard the aircraft or missile. FIG. 3 illustrates these variables using as an example the Air Force/Boeing X-45A Unmanned Combat Air Vehicle. These control surface commands are used in the CADS algorithms to correctly model the aerodynamic and propulsive forces and moments. The models for the aerodynamic and propulsive forces are described in the section on detailed model equations. These detailed model equations are numerically integrated in the extended Kalman filter as part of the AOA and AOSS estimation process.

The extended Kalman filter estimates the stochastic state vector x by processing stochastic measurements z. The error covariance matrix P is defined as $E\{(x-\hat{x})(x-\hat{x})^T\} = P \in \Re^{n_x \times n_x}$, where $E\{\bullet\}$ denotes the expectation operator. The error covariance matrix is propagated in time using $$\dot{P}(t) = A^T(t)P(t) + P(t)A(t) + GQ(t)G^T \quad (0.3)$$

where A is the Jacobian from (0.2) and Q is the plant process disturbance covariance matrix.

These models are used in the CADS algorithms, and will be further described following description of the extended Kalman filter algorithms.

Extended Kalman Filter Algorithms

The extended Kalman filter sequentially estimates the state vector x modeled in (0.1) by processing measurements z. The filter is comprised of a time update algorithm, for propagating the state vector x and error covariance matrix P between measurements, and a measurement update algorithm, that updates the state vector x and error covariance matrix P based upon the measurements z.

Figure 4:
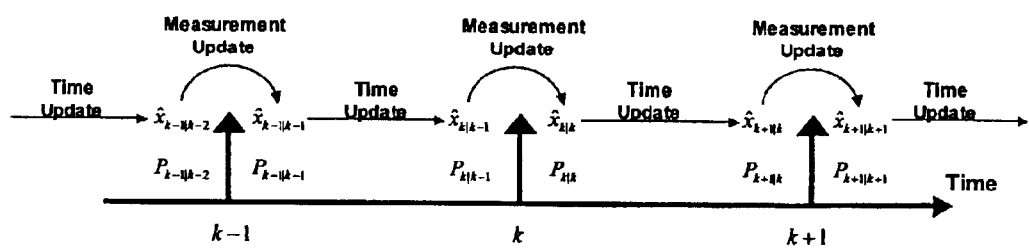
FIG. 4 is a timeline for state vector time propagation and measurement updating used to define notation in accordance with a preferred embodiment of the invention.

FIG. 4 illustrates a timeline for state vector time propagation and measurement updating, and is used to define notation and explain the processing in the CADS software. Although (0.1) is continuous, FIG. 4 illustrates a discrete-time process that is fundamental to the software processing in accordance with a preferred embodiment of the invention.

The estimated state vector $\hat{x}$ is discrete, and is the conditional mean estimate of the vector x given the measurement z, written as $\hat{x} = E\{x|z\}$. The notation as illustrated in FIG. 4 has two subscripts, the first indicating the stage in time, and the second subscript the latest measurement used in the measurement update algorithm. The first subscript denotes time, and follows the time partitioning on the time scale in FIG. 4. The time update algorithm propagates $\hat{x}_{k-1|k-1}$ to $\hat{x}_{k|k-1}$, $\hat{x}_{k|k}$ to $\hat{x}_{k+1|k}$ and so forth. The measurement update reflected in the second subscript indicates the processing of the i-th set of measurements. When z is processed at time (k-1), $\hat{x}_{k-1|k-2}$ is updated to be $\hat{x}_{k-1|k-1}$. When z is processed at time (k), $\hat{x}_{k|k-1}$ is updated to be $\hat{x}_{k|k}$, and so forth.

Numerical integration algorithms are used to integrate the continuous differential equations. Either Euler integration or other, including more advanced, integration algorithms can be used. These time and measurement update equations for the state and error covariances are:

Time Update $$\hat{x}_{k+1|k} = \hat{x}_{k|k} + a(\hat{x}_{k|k}, u(k), k)\Delta t \quad (0.4)$$

$$P_{k+1|k} = P_{k|k} + (AP_{k|k} + P_{k|k}A^T + GQG^T)\Delta t$$

Measurement Update $$K_k = P_{k|k-1}H^T(\hat{x}_{k|k-1}, u(k), k)(H(\hat{x}_{k|k-1}, u(k), k)PH^T(\hat{x}_{k|k-1}, u(k), k) + R)^{-1} \quad (0.5)$$

$$P_{k|k} = (I_{n_s} - K_k H(\hat{x}_{k|k-1}, u(k), k))P_{k|k-1}(I_{n_s} - K_k H(\hat{x}_{k|k-1}, u(k), k))^T + K_k R K_k^T$$

$$\hat{x}_{k|k} = \hat{x}_{k|k-1} + K_k(z_k - h(\hat{x}_{k|k-1}, u(k), k))$$

where $z_k$ represents the measurement vector z at time k, the matrix $R \in \Re^{n_z \times n_z}$ is the measurement noise covariance matrix, and $H(\hat{x}_{k|k-1}, u(k), k)$ is the Jacobian matrix described in (0.2). The equations described in (0.4) and (0.5) generically describe the extended Kalman filter processing in the CADS software. The detailed model equations coupled with the extended Kalman filter equations form the CADS algorithms.

Detailed Model Equations

The CADS state vector from (0.1) is partitioned into longitudinal (lon) and lateral-directional (lat-dir) as follows.

$$\hat{x}_{lon} = \begin{bmatrix} \hat{\theta} & \hat{q} & \hat{\alpha} & \hat{V} \end{bmatrix}^T \quad \hat{x}_{lat-dir} = \begin{bmatrix} \hat{\phi} & \hat{p} & \hat{r} & \hat{\beta} \end{bmatrix}^T \quad (0.6)$$

The detailed model equations for these states are given as follows:

$$\dot{\theta} = q\cos\phi - r\sin\phi \quad (0.7)$$

$$\dot{\phi} = p + q\sin\phi\tan\theta + r\cos\phi\tan\theta$$

$$\begin{bmatrix} \dot{p} \\ \dot{q} \\ \dot{r} \end{bmatrix} = I^{-1}\left(\begin{bmatrix} L \\ M \\ N \end{bmatrix} - \begin{bmatrix} p \\ q \\ r \end{bmatrix} \times I \begin{bmatrix} p \\ q \\ r \end{bmatrix}\right) \quad (0.8)$$

$$\dot{\alpha} = \frac{1}{Vm\cos\beta}[-L_{IFT} + Z_T\cos\alpha - X_T\sin\alpha + \quad (0.9)$$

$$mg(\cos\alpha\cos\phi\cos\theta + \sin\alpha\sin\theta)] + q -$$

$$\tan\beta(p\cos\alpha + r\sin\alpha)$$

$$\dot{\beta} = \frac{1}{mV}[D_{RAG}\sin\beta + Y\cos\beta - X_T\cos\alpha\sin\beta + Y_T\cos\beta -$$

$$Z_T\sin\alpha\sin\beta + mg(\cos\alpha\sin\beta\sin\theta + \cos\beta\sin\phi\cos\theta -$$

$$\sin\alpha\sin\beta\cos\phi\cos\theta)] + p\sin\alpha - r\cos\alpha$$

$$\dot{V} = \frac{1}{m}[-D_{RAG}\cos\beta + Y\sin\beta + X_T\cos\alpha\cos\beta + Y_T\sin\beta +$$

$$Z_T\sin\alpha\cos\beta - mg(\cos\alpha\cos\beta\sin\theta - \sin\beta\sin\phi\cos\theta -$$

$$\sin\alpha\cos\beta\cos\phi\cos\theta)].$$

The right side of the differential equations (0.7), (0.8), and (0.9) are evaluated using the posteriori state estimate $\hat{x}_{k|k}$ to form $\alpha(\hat{x}_{k|k}, u(k), k)$ used in the time update of the state vector described in (0.4). The Jacobian of equations (0.7), (0.8), and (0.9) forms the linear model $A(x(t),u(t),t)$ used to time propagate the error covariance matrix $P_{k+1|k}$ in (0.4). These expressions are partitioned similar to (0.6) into longitudinal and lateral-directional (lat-dir) components, and are implemented in parallel computations in the CADS software.

With these expressions and the models of the aerodynamic forces, propulsive forces, and moments that are embedded in them, the CADS algorithms successfully estimate AOA and AOSS, i.e., the aerodynamic forces ($D_{RAG}$ Y $L_{IFT}$) (drag, side force, lift), the propulsive forces ($X_T Y_T Z_T$) in the body x, y and z directions, and the moments (L M N) about the body roll, pitch, and yaw axes, respectively. The models of the forces and moments are tailored to each aircraft or missile to which this invention may be applied. The vector u used in evaluating the Jacobian matrices in (0.2) contains the control surface commands from the aircraft's flight control system. These commands are used to compute the forces and moments (aerodynamic and propulsive) as commanded by the aircraft's flight control system.

Measurements Used In CADS Algorithms

The measurement vector z used in the extended Kalman filter measurement update described in (0.5) is given by:

$$z = \begin{bmatrix} \theta \\ \phi \\ p \\ q \\ r \\ A_x \\ A_y \\ A_z \end{bmatrix} = \begin{bmatrix} \text{Navigator pitch attitude} \\ \text{Navigator roll attitude} \\ \text{IMU roll rate} \\ \text{IMU pitch rate} \\ \text{IMU yaw rate} \\ \text{IMU }x\text{-body axis acceleration} \\ \text{IMU }y\text{-body axis acceleration} \\ \text{IMU }z\text{-body axis acceleration} \end{bmatrix} \quad (0.10)$$

In addition to the navigation and IMU measurements listed in (0.10), the CADS algorithms require dynamic pressure $\bar{q}$. The dynamic pressure measurement is supplied by a conventional air data system hardware and software.

The measurement equations relating the states in x to the measurements z in (0.10) are given by $$\theta = \theta, \quad \phi = \phi, \quad p = p, \quad q = q, \quad r = r \quad (0.11)$$

$$A_x = \frac{1}{gm}[X_T - D_{RAG}\cos\alpha + L_{IFT}\sin\alpha]$$

$$A_y = \frac{1}{gm}[Y_T + Y]$$

$$A_z = \frac{1}{gm}[Z_T - D_{RAG}\sin\alpha - L_{IFT}\cos\alpha]$$

The Jacobian of the measurement equations in (0.11) forms the linear model $H(x(t),u(t),t)$ used in the measurement update of the state and error covariance matrix $P_{k|k}$ in (0.5). These expressions are partitioned similar to (0.6) into longitudinal and lateral-directional (lat-dir) components.

Thus, the computational air data system of the present invention estimates AOA and AOSS using an extended Kalman filter, based on high fidelity six-degree-of-freedom (x, y, z, pitch, roll, yaw) equations of motion and models, and processing inertial measurement unit measurements of body axis rates and accelerations, completely eliminating the need for air data sensors for determining AOA and AOSS. The computer program listing appendix lists out the Jacobians A and H used in the extended Kalman filter, as well as all other algorithmic details of the CADS in accordance with a preferred embodiment of the invention.

While the present invention has been described by reference to specific embodiments and specific uses, it should be understood that other configurations and arrangements could be constructed, and different uses could be made, without departing from the scope of the invention as set forth in the following claims.

What is claimed is:

1. A method for estimating angle-of-attack and angle-of-sideslip of an aircraft, said method comprising the steps of:

modeling the full six degree-of-freedom dynamics, aerodynamics, and propulsion forces and moments of the aircraft in a nonlinear state space form;

utilizing extended Kalman filters with said modeling to estimate said angle-of-attack and angle-of-sideslip;

utilizing inertial measurement system measurements of the aircraft's body rates and body accelerations in estimating said angle-of-attack and angle-of-sideslip; and utilizing dynamic pressure measurements in estimating the angle-of-attack and angle-of-sideslip.

2. The method of claim 1 further comprising the step of utilizing said extended Kalman filters to estimate the dynamic state vector containing said angle-of-attack and angle-of-sideslip.

3. The method of claim 2 further comprising the steps of:

time propagating dynamic state vectors and error covariance matrices between dynamic pressure measurements, and updating the state vector and error covariance based upon said dynamic pressure measurements.

4. The method of claim 1 wherein the dynamics of the aircraft are modeled in a nonlinear state space form as:

$$\dot{x}(t) = a(x(t),u(t),t) + Gw(t)$$

$$z(t) = h(x(t),u(t),t) + v(t)$$

where $x \in \Re^{n_x}$ is the state vector, $u \in \Re^{n_u}$ is the control input vector, $w \in \Re^{n_w}$ is the stochastic plant disturbance vector, $z \in \Re^{n_z}$ is the measurement vector, $v \in \Re^{n_z}$ is the stochastic measurement noise, $G \in \Re^{n_w \times n_w}$ is the plant disturbance distribution matrix, and the vector fields $a(\bullet)$ and $h(\bullet)$ model said state dynamics and said inertial measurement system measurements.

5. The method of claim 4 further comprising the step of partitioning said state vector into longitudinal and lateral-directional components in accordance with:

$$\hat{x}_{lon} = [\hat{\theta} \hat{q} \hat{\alpha} \hat{V}]^T \quad \hat{x}_{lat-dir} = [\hat{\phi} \hat{p} \hat{r} \hat{\beta}]^T.$$

6. The method of claim 4 comprising the steps of modeling the aircraft's dynamics for use in estimating said angle-of-attack and angle-of-sideslip as:

$$\dot{\theta} = q\cos\phi - r\sin\phi$$

$$\dot{\phi} = p + q\sin\phi\tan\theta + r\cos\phi\tan\theta$$

$$\begin{bmatrix} \dot{p} \\ \dot{q} \\ \dot{r} \end{bmatrix} = I^{-1}\left(\begin{bmatrix} L \\ M \\ N \end{bmatrix} - \begin{bmatrix} p \\ q \\ r \end{bmatrix} \times I \begin{bmatrix} p \\ q \\ r \end{bmatrix}\right)$$

$$\dot{\alpha} = \frac{1}{Vm\cos\beta}[-L_{IFT} + Z_T\cos\alpha - X_T\sin\alpha + mg(\cos\alpha\cos\phi\cos\theta + \sin\alpha\sin\theta)] + q - \tan\beta(p\cos\alpha + r\sin\alpha)$$

$$\dot{\beta} = \frac{1}{mV}[D_{RAG}\sin\beta + Y\cos\beta - X_T\cos\alpha\sin\beta + Y_T\cos\beta - Z_T\sin\alpha\sin\beta + mg(\cos\alpha\sin\beta\sin\theta + \cos\beta\sin\phi\cos\theta - \sin\alpha\sin\beta\cos\phi\cos\theta)] + p\sin\alpha - r\cos\alpha$$

$$\dot{V} = \frac{1}{m}[-D_{RAG}\cos\beta + Y\sin\beta + X_T\cos\alpha\cos\beta + Y_T\sin\beta + Z_T\sin\alpha\cos\beta - mg(\cos\alpha\cos\beta\sin\theta - \sin\beta\sin\phi\cos\theta - \sin\alpha\cos\beta\cos\phi\cos\theta)].$$

7. The method of claim 6 further comprising the steps of evaluating the right side of said equations wherein the dynamics of the aircraft are modeled in a nonlinear state space form and wherein the aircraft's dynamics for use in estimating said angle-of-attack and angle-of-sideslip are modeled using a posteriori state estimate for use in a time update of the state vector, and time propagating an error covariance matrix using a linear model formed from the Jacobian of said equations.

8. The method of claim 4 further comprising the step of processing Jacobians of $a(\bullet)$ and $h(\bullet)$ with respect to thee state vector x in the extended Kalman filter.

9. The method of claim 8 wherein the Jacobians are expressed by:

$$A(x(t), u(t), t) = \frac{\partial a(x(t), u(t), t)}{\partial x}\bigg|_{x=\hat{x}}$$

$$H(x(t), u(t), t) = \frac{\partial h(x(t), u(t), t)}{\partial x}\bigg|_{x=\hat{x}}.$$

Where $a(x(t),u(t),t)$ is described by the right side of the following equations:

$$\dot{\theta} = q\cos\phi - r\sin\phi$$

$$\dot{\phi} = p + q\sin\phi\tan\theta + r\cos\phi\tan\theta$$

$$\begin{bmatrix} \dot{p} \\ \dot{q} \\ \dot{r} \end{bmatrix} = I^{-1}\left(\begin{bmatrix} L \\ M \\ N \end{bmatrix} - \begin{bmatrix} p \\ q \\ r \end{bmatrix} \times I \begin{bmatrix} p \\ q \\ r \end{bmatrix}\right)$$

$$\dot{\alpha} = \frac{1}{Vm\cos\beta}[-L_{IFT} + Z_T\cos\alpha - X_T\sin\alpha + mg(\cos\alpha\cos\phi\cos\theta + \sin\alpha\sin\theta)] + q - \tan\beta(p\cos\alpha + r\sin\alpha)$$

$$\dot{\beta} = \frac{1}{mV}[D_{RAG}\sin\beta + Y\cos\beta - X_T\cos\alpha\sin\beta + Y_T\cos\beta - Z_T\sin\alpha\sin\beta + mg(\cos\alpha\sin\beta\sin\theta + \cos\beta\sin\phi\cos\theta - \sin\alpha\sin\beta\cos\phi\cos\theta)] + p\sin\alpha - r\cos\alpha$$

$$\dot{V} = \frac{1}{m}[-D_{RAG}\cos\beta + Y\sin\beta + X_T\cos\alpha\cos\beta + Y_T\sin\beta + Z_T\sin\alpha\cos\beta - mg(\cos\alpha\cos\beta\sin\theta - \sin\beta\sin\phi\cos\theta - \sin\alpha\cos\beta\cos\phi\cos\theta)]$$

and where $h(x(t),u(t),t)$ is described by the right side of the following equations:

$$\theta = \theta, \quad \phi = \phi, \quad p = p, \quad q = q, \quad r = r$$

$$A_x = \frac{1}{gm}[X_T - D_{RAG}\cos\alpha + L_{IFT}\sin\alpha]$$

$$A_y = \frac{1}{gm}[Y_T + Y]$$

$$A_z = \frac{1}{gm}[Z_T - D_{RAG}\sin\alpha - L_{IFT}\cos\alpha].$$

10. The method of claim 4 wherein the plant disturbance vector w and measurement noise vector v have covariance matrices Q and R, respectively.

11. The method of claim 4 further comprising the step of estimating the stochastic state vector x by processing stochastic measurement z.

12. The method of claim 11 further comprising the step of processing an error covariance matrix in accordance with the expression $E\{(x-\hat{x})(x-\hat{x})^T\} = P \in \Re^{n_x \times n_x}$, propagated in time in accordance with the expression $\dot{P}(t) = A^T(t)P(t) + P(t)A(t) + GQ(t)G^T$, wherein A is said Jacobian described by $$A(x(t), u(t), t) = \frac{\partial a(x(t), u(t), t)}{\partial x}\bigg|_{x=\hat{x}}$$

and Q is said plant process disturbance vector covariance matrix.

13. A system for estimating angle-of-attack and angle-of-sideslip of an aircraft, said system comprising:
  inertial system sensors for measuring body rates and body accelerations of the aircraft,
  an air data system, said air data system providing measurement of dynamic pressure to be used in forming aerodynamic and propulsive forces and moments used to model the aircraft's dynamics,
  a nonlinear model of the aircraft's equations of motion including models of the aerodynamic and propulsive forces and moments, and an extended Kalman filter to be used in estimating said angle-of-attack and angle-of-sideslip in response to said measurements and an aerodynamic model of said aircraft.

14. The system of claim 13 further comprising temperature and pressure sensors for measuring the dynamic pressure of the aircraft during flight to be used in developing the aerodynamic forces and moments during flight for estimating said angle-of-attack and angle-of-sideslip in response to said measurements.

15. The system of claim 14 wherein said extended Kalman filter estimates the dynamic state vectors associated with said aircraft's flight through the atmosphere.

16. The system of claim 15 wherein:
dynamic state vectors and error covariance matrices are time propagated between measurements, and
said state vector and error covariance are updated based upon said measurements.

17. The system of claim 14 wherein the dynamics of the aircraft are modeled in a nonlinear state space form as:

$$\dot{x}(t) = a(x(t), u(t), t) + Gw(t)$$

$$z(t) = h(x(t), u(t), t) + v(t)$$

where $x \in \Re^{n_x}$ is the state vector, $u \in \Re^{n_u}$ is the control input vector, $w \in \Re^{n_w}$ is the stochastic plant disturbance vector, $z \in \Re^{n_z}$ is the measurement vector, and $v \in \Re^{n_z}$ is the stochastic measurement noise vector, and the vector fields $a(\bullet)$ and $h(\bullet)$ model said state dynamics and said inertial system measurements.

18. The system of claim 17 wherein said state vector is partitioned into longitudinal and lateral-directional components in accordance with:

$$\hat{x}_{lon} = [\hat{\theta} \hat{q} \hat{\alpha} \hat{V}]^T \quad \hat{x}_{lat-dir} = [\hat{\phi} \hat{p} \hat{r} \hat{\beta}]^T.$$

19. The system of claim 18 wherein said state vector is modeled as:

$$\dot{\theta} = q\cos\phi - r\sin\phi$$

$$\dot{\phi} = p + q\sin\phi\tan\theta + r\cos\phi\tan\theta$$

$$\begin{bmatrix} \dot{p} \\ \dot{q} \\ \dot{r} \end{bmatrix} = I^{-1} \left( \begin{bmatrix} L \\ M \\ N \end{bmatrix} - \begin{bmatrix} p \\ q \\ r \end{bmatrix} \times I \begin{bmatrix} p \\ q \\ r \end{bmatrix} \right)$$

$$\dot{\alpha} = \frac{1}{Vm\cos\beta}[-L_{IFT} + Z_T\cos\alpha - X_T\sin\alpha + mg(\cos\alpha\cos\phi\cos\theta + \sin\alpha\sin\theta)] + q - \tan\beta(p\cos\alpha + r\sin\alpha)$$

$$\dot{\beta} = \frac{1}{mV}[D_{RAG}\sin\beta + Y\cos\beta - X_T\cos\alpha\sin\beta + Y_T\cos\beta - Z_T\sin\alpha\sin\beta + mg(\cos\alpha\sin\beta\sin\theta + \cos\beta\sin\phi\cos\theta - \sin\alpha\sin\beta\cos\phi\cos\theta)] + p\sin\alpha - r\cos\alpha$$

$$\dot{V} = \frac{1}{m}[-D_{RAG}\cos\beta + Y\sin\beta + X_T\cos\alpha\cos\beta + Y_T\sin\beta + Z_T\sin\alpha\cos\beta - mg(\cos\alpha\cos\beta\sin\theta - \sin\beta\sin\phi\cos\theta - \sin\alpha\cos\beta\cos\phi\cos\theta)]$$

the right side of said equations wherein the dynamics of the aircraft are modeled in a nonlinear state space form, wherein said state vector is partitioned into longitudinal and lateral-directional components, and wherein said state vector is modeled being evaluated using the a posteriori state estimate for use in a time update of the state vector, and an error covariance matrix being propagated using a linear model formed from the Jacobian of said equations.

20. The system of claim 17 wherein Jacobians of $a(\bullet)$ and $h(\bullet)$ are processed with respect to the state vector x in the extended Kalman filter.

21. The system of claim 20 wherein the Jacobians are expressed by:

$$A(x(t), u(t), t) = \left.\frac{\partial a(x(t), u(t), t)}{\partial x}\right|_{x=\hat{x}}$$

$$H(x(t), u(t), t) = \left.\frac{\partial h(x(t), u(t), t)}{\partial x}\right|_{x=\hat{x}}.$$

22. The system of claim 17 wherein the plant disturbance vector w and measurement noise vector v have covariance matrices Q and R, respectively.

23. The system of claim 17 wherein the stochastic state vector x is estimated by processing stochastic measurements z using an extended Kalman filter.

24. The system of claim 23 wherein an error covariance matrix is processed in accordance with the expression $E\{(x-\hat{x})(x-\hat{x})^T\} = P \in \Re^{n_x \times n_x}$, propagated in time in accordance with the expression $\dot{P}(t) = A^T(t)P(t) + P(t)A(t) + GQ(t)G^T$, wherein A is said Jacobian of $$A(x(t), u(t), t) = \left.\frac{\partial a(x(t), u(t), t)}{\partial x}\right|_{x=\hat{x}}$$

$$H(x(t), u(t), t) = \left.\frac{\partial h(x(t), u(t), t)}{\partial x}\right|_{x=\hat{x}}$$

and Q is said plant process disturbance vector covariance matrix.

* * * * *